UNITED STATES PATENT OFFICE.

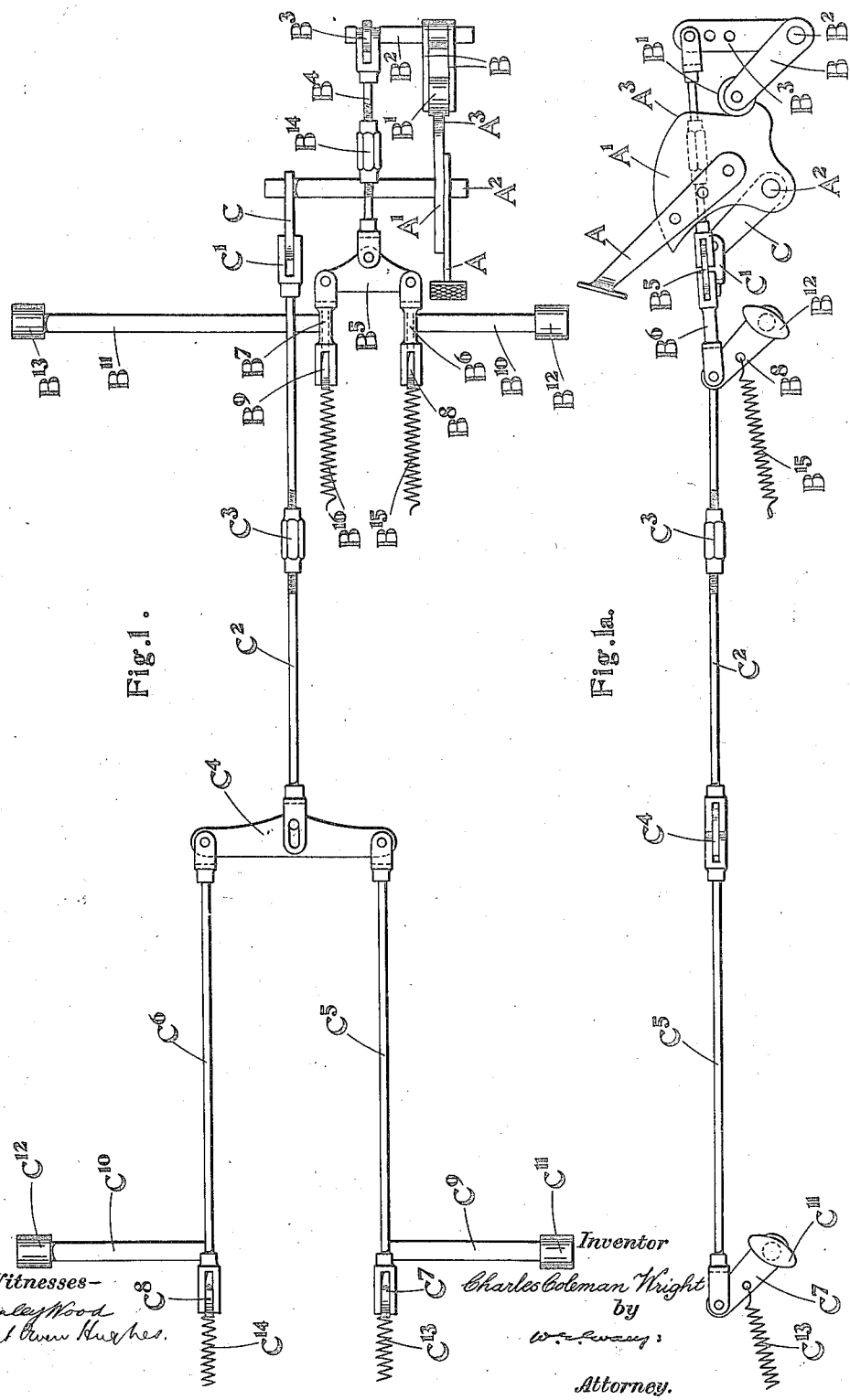

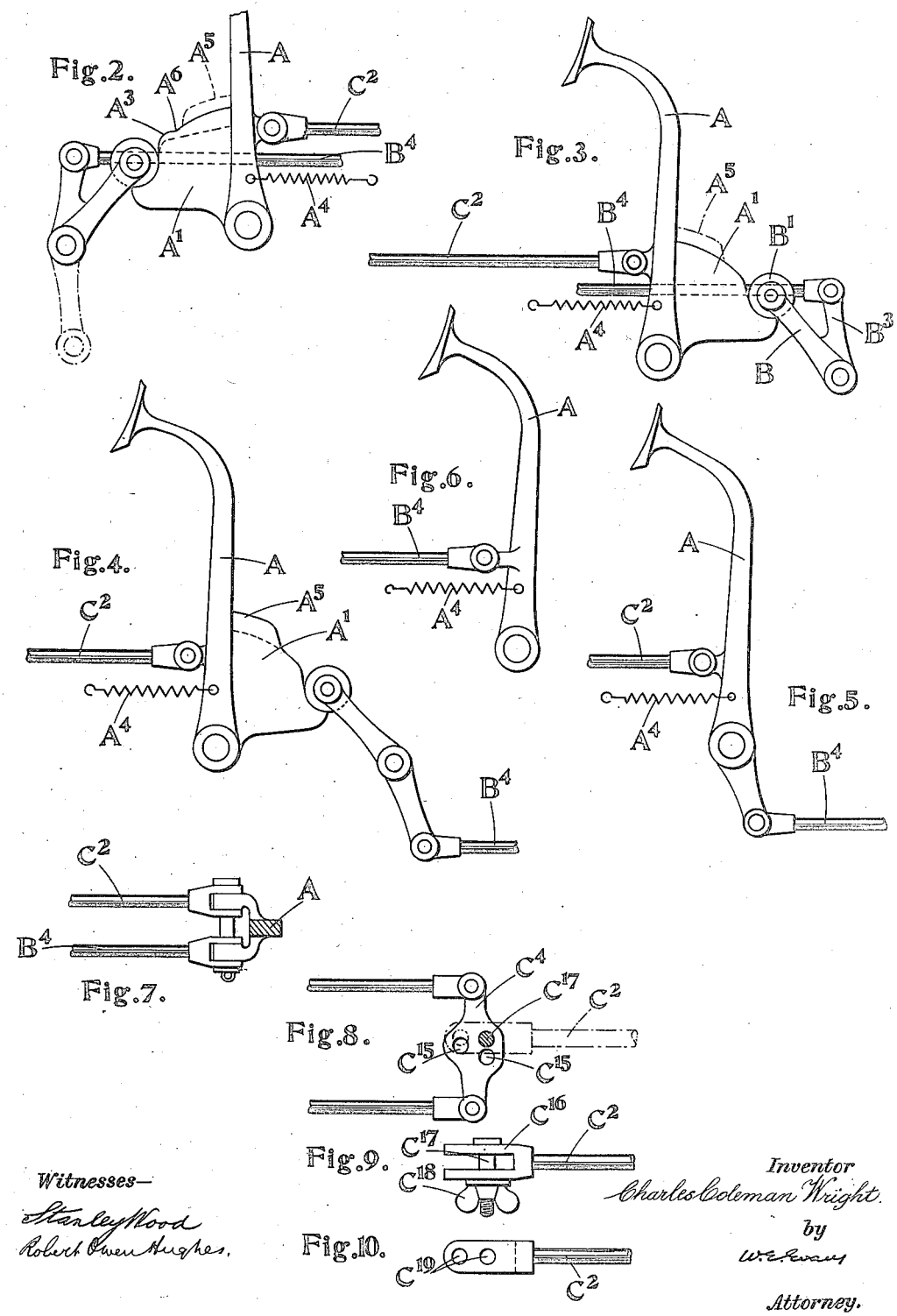

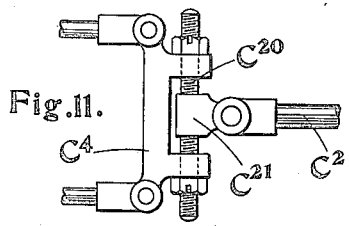
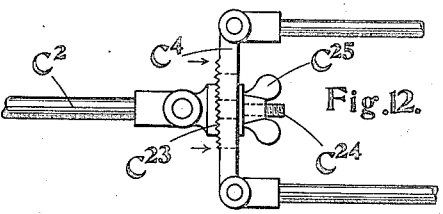
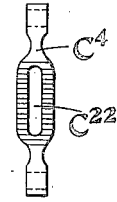
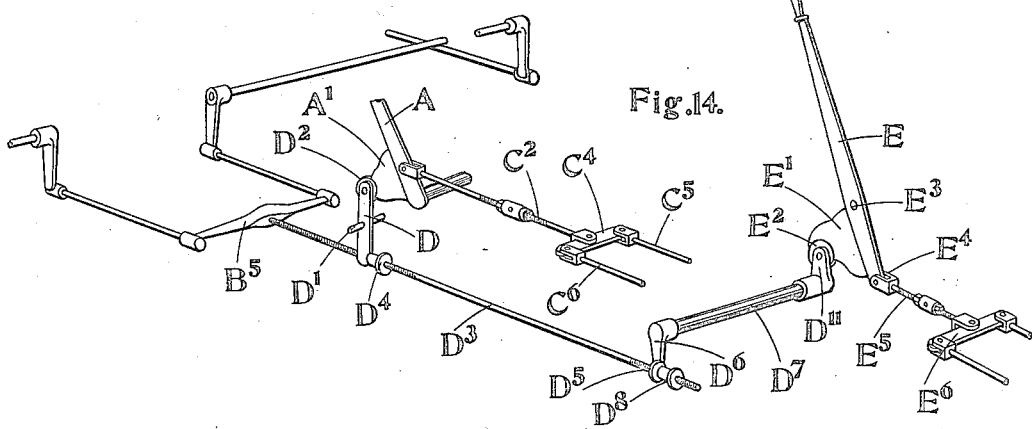
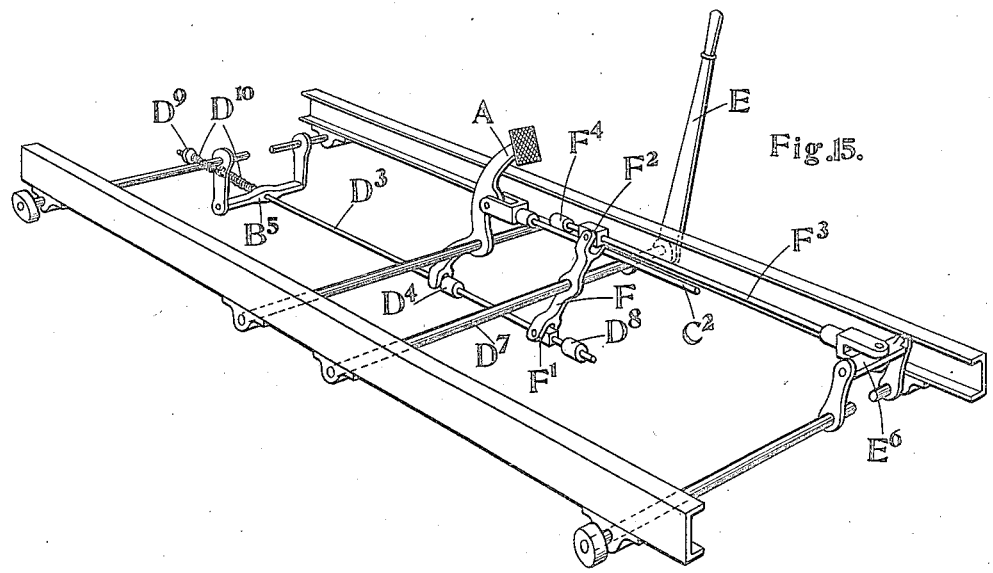

CHARLES COLEMAN WRIGHT, OF PARKFIELD, PRINCES RISBOROUGH, ENGLAND.

BRAKE-APPLYING MECHANISM.

1,222,839. Specification of Letters Patent. Patented Apr. 17, 1917.

Application filed July 7, 1913. Serial No. 777,680.

*To all whom it may concern:*

Be it known that I, CHARLES COLEMAN WRIGHT, a subject of the King of Great Britain and Ireland, residing at Wellesley, Parkfield, Princes Risborough, in the county of Buckingham, England, have invented certain new and useful Improvements in Brake-Applying Mechanism, of which the following is a specification.

This invention relates to improvements in motor-vehicles and has particular reference to apparatus for and method of applying brakes to the road-wheels or parts in connection with them. Throughout the specification where reference is made to applying brakes to the road-wheels it is to be understood to cover also the application of the brakes to parts in operative connection with the road-wheels and may include Cardan, or differential or other forms of brake.

The invention has particular reference to improvements in a type of apparatus comprising a lever and operative connections between it and brakes for the front and rear wheels respectively all so arranged that by a follow-on movement of the lever the brakes are made to be successively effective. It also has reference to apparatus in which brakes for the front and rear wheels are applied simultaneously. A follow-on movement must be understood to refer to one in which there is no reversal of effort although the movement may take place in a straight or curved path.

According to the present invention brake-applying mechanism comprises a lever and operative connections between it and the brakes for the front and rear wheels respectively so arranged that all the brakes are applied simultaneously and by a follow-on movement of the lever the braking effort of one brake or set of brakes is varied while that of another brake or set (*a*) remains limited or unaltered, or (*b*) is varied in a different ratio from the variation of the first mentioned brake or set.

The invention is also applicable in the case when brakes or sets of brakes are applied in succession and where one of the characterizing features (*a*) or (*b*) referred to above takes place after all the brakes have become effective.

A feature of the invention comprises brake-applying mechanism of the type described wherein after a predetermined braking effort has been applied by one brake or set of brakes that effort may be decreased to a desired extent while the braking effort of another brake or brakes may remain unchanged or may be decreased or increased.

According to a modification of the invention brake-applying mechanism comprises a lever and operative connections between it and brakes for the front and rear wheels respectively all so arranged that though the brakes are simultaneously applied a certain one or more of them is or are applied with greater power than the other or others combined with means to establish maximum effective power of the brake or sets of brakes in succession during a follow-on movement of the lever.

According to a further modification the connection between the brake-applying mechanism and the lever is capable of adjustment (as for example at the compensating bar or similar part of the mechanism) to determine the sequence in which the brakes shall be applied.

There may be also provided an independently operated brake or set of brakes in addition to any of the brake-mechanisms herein referred to, and an adjustable connection may be provided between some or all of said brakes and a portion of the operating gear for the said independently operated brake or set whereby both sets may be applied simultaneously.

Other features of the invention will be more clearly understood with reference to the following description taken in connection with the accompanying drawings which illustrate several preferred embodiments of the invention, and in which—

Figure 1 is a diagrammatic illustration of one form of brake-applying mechanism, Fig. 1ª is an elevation of Fig. 1, Figs. 2–6 illustrate details of modifications, Fig. 7 is a part plan view part in section of Fig. 6, Fig. 8 is a detail in plan view of a means for attachment to the compensating bar of connections for one set of brakes.

Fig. 9 is an elevation of a detail of Fig. 8,

Fig. 10 is a plan view of Fig. 9,

Figs. 11 and 12 show further modified details of the invention,

Fig. 13 is a view of a detail of the construction shown in Fig. 12, looking in the direction of the arrows, Fig. 14 shows diagrammatically a modified arrangement of brake-applying mechanism, and Fig. 15 is a diagrammatic illustration of a still further modified brake-applying mechanism.

Like letters indicate like parts throughout the drawings.

The invention is particularly applicable in cases where the steering wheels are also driving wheels.

Referring to Fig. 1, the brake-applying lever A illustrated in its preferred embodiment as a pedal is mounted on, or may be otherwise connected to, a rock-shaft and has either secured to it or moving with it, through the medium of a shaft or otherwise, a cam $A^1$. In the embodiment illustrated the pedal lever A is secured in any desired manner to the cam $A^1$ and the latter is mounted on a rock-shaft $A^2$ to which it is rigidly secured. The cam $A^1$ engages the lever B through the roller $B^1$ journaled in the end thereof, the lever being rigidly secured to, and rotatable with, a rock-shaft $B^2$ carrying another arm $B^3$. The parts B, $B^2$, $B^3$ correspond in action to a bell-crank lever and may be replaced thereby. The arm $B^3$ is connected by means of a rod $B^4$ with a compensating bar $B^5$ of the front wheel brakes. The compensating bar $B^5$ is pivotally connected, as shown, to the links $B^6$ $B^7$ which in their turn are pivotally connected through arms $B^8$ $B^9$ respectively to rock-shafts $B^{10}$ $B^{11}$ which operate brakes in connection with each of the front wheels. The arms $B^8$ $B^9$ are rigidly mounted on the rock-shafts $B^{10}$ $B^{11}$ respectively. In the following examples, cams, such as $B^{12}$ $B^{13}$ are shown at the end of the rock-shafts and are to be understood to represent diagrammatically any form of brake-applying device which may be conveniently used. The brakes for the front or steering wheels are therefore independent of one another and are operated through means of the compensating bar. The degree and manner of their operation is controlled by the curvature or shape of the cam $A^1$ which, in this particular embodiment, is caused to apply the brakes with increasing pressure until the point $A^3$ of the cam has been brought into contact with the roller $B^1$. After this the cam is concentric about its center of oscillation in the rock-shaft $A^2$ and no further braking effort is applied to the front brakes. The length of the link $B^4$ may be adjusted, as for example by a screw-adjustment diagrammatically illustrated at $B^{14}$ and the arms $B^8$ and $B^9$ are retained by the springs $B^{15}$ and $B^{16}$ respectively normally to hold the brakes in the off position.

The rock-shaft $A^2$ has mounted and rigidly secured to it a lever C pivotally connected at $C^1$ to a rod $C^2$ whose length is adjustable by means of a screw-adjustment diagrammatically shown at $C^3$. The rod $C^2$ is connected in a manner similar to the connections for the front wheel brakes, through a compensating bar $C^4$, links $C^5$ and $C^6$, levers $C^7$ and $C^8$, and rock-shafts $C^9$ and $C^{10}$ with brake-applying means diagrammatically indicated at $C^{11}$ and $C^{12}$ as explained in connection with cams $B^{12}$ and $B^{13}$. The levers $C^7$ and $C^8$ are controlled by springs $C^{13}$ and $C^{14}$ normally to retain the brakes in the off position. As illustrated, the connection between the rod $C^2$ and the compensating bar $C^4$ is of the pin-and-slot type or it may be of any other type which would permit a certain amount of lost motion between the rod and the compensating bar so that during the first movement of the rock-shaft $A^2$ the brakes in connection with the back wheels are not operated, that is to say, while the front brakes are being applied the back wheels are not operated, and in the embodiment illustrated they do not come into operation until the cam $A^1$ engages the roller $B^1$ at its concentrically curved portion. Obviously this is subject to modification as desired provided that the construction allows brakes to be applied in connection with the front wheels before the brakes are applied in connection with the back, and in this case the power of the front brakes is limited to a predetermined degree. The rock-shafts $B^{10}$ and $B^{11}$, or $C^9$ and $C^{10}$ may operate the brakes by means of cams situated at the end of the said shafts respectively in the manner illustrated. Other adjusting means may be employed in connection with the various parts as may be found desirable.

The connections between the rods $B^4$ and $C^2$ and the compensating bars $B^5$ and $C^4$ respectively are preferably arranged so that they may be shifted along the lengths of their respective bars. One means of doing this is illustrated in Fig. 8 in which the compensating bar, denoted by the reference letter $C^4$, has several holes $C^{15}$ provided in it and is engaged by a bifurcated end $C^{16}$ of the rod $C^2$. This end is illustrated in Figs. 9 and 10 of which Fig. 9 shows the provision of a bolt $C^{17}$ and fly-nut $C^{18}$ by means of which the rod $C^2$ may be secured to the compensating bar by means of holes $C^{19}$ provided in it and the holes $C^{15}$. Thus its position on the compensating bar can be varied at will.

A further modification is illustrated in Fig. 11 in which the compensating bar $C^4$ carries a rotatable screw-member $C^{20}$ engaging head $C^{21}$ on the rod $C^2$. By rotation of the screw-member $C^{20}$ in either one direction or the other the head $C^{21}$ of the rod $C^2$ may be moved toward one end or the other of the compensating bar.

Fig. 12 shows a further modification in which the compensating bar $C^4$ is formed with a slot $C^{22}$ in it as shown in Fig. 13, the edges of the slot being ribbed or serrated to engage with a correspondingly ribbed head $C^{23}$ on the end of the rod $C^2$. The head $C^{23}$ has a projecting screw-portion $C^{24}$ adapted to pass through the slot $C^{22}$ and is engaged by a fly-nut $C^{25}$ so that by means of the nut and the serrations or ribs on the contacting surfaces of the head $C^{23}$ and the slot $C^{22}$ the head $C^{23}$ may be rigidly held in any desired position in the length of the compensating bar $C^4$. In connection with the modifications shown in Figs. 8–12 the necessary lost motion devices would be inserted in convenient positions in the mechanism.

Thus if the connection between the rod $C^2$ and the compensating bar $C^4$ be to one side of the middle of the latter, the operation of the lever or pedal A will cause the brake in connection with that end of the cross-bar to be applied first and when it is applied the end of the cross-bar in connection with it will remain fixed and will act as a fulcrum for the remainder of the cross-bar until the other brake is also applied. The springs $C^{13}$ and $C^{14}$ combined with the link mechanism connecting the various parts provide a floating fulcrum for the first applied brake and the power thereof will be controlled to a large extent by the tension of the springs. If, however, the springs such as $C^{13}$ and $C^{14}$ are dispensed with the power of the brake which is first applied will be very small indeed until the second brake is applied and when both brakes are on the power of the first applied brake will be greater than that of the other on account of the uneven distribution of the pull on the compensating bar $C^4$. What has been described in relation to the connections between the rod $C^2$ and the compensating bar $C^4$ and the subsequent operation of the braking devices $C^{11}$ $C^{12}$ is equally applicable to the connection between the rod $B^4$ and the compensating bar $B^5$ and the operation of its brakes. It will therefore be obvious that by suitably arranging the parts, diagonal braking may be effected, that is to say, a front and a back wheel disposed diagonally of the vehicle may be braked before the other wheels of the vehicle and the total power of the brakes, when full on, may be controlled as hereinbefore described.

In thus applying the brakes diagonally of the vehicle, the pressure of one pair of brakes will always be maintained greater than the pressure of the other pair and in the example given the pressure of the brakes first applied, or the brake-actuating mechanism, will be greater than that of the second pair of brakes. Thus, if the springs $C^{13}$ and $C^{14}$ or their equivalent are employed, the brakes may be applied successively in pairs diagonally disposed, and the cam $A^1$ could be dispensed with and connections from the pedal to the brakes, such as that illustrated in Figs. 6 and 7, could be employed. That is to say, a direct pull could be applied by the pedal A through the rods $B^4$ and $C^2$ pivotally connected thereto and to the cross-bars $B^5$ and $C^4$ respectively, but the connections of these rods and cross-bars would be to one side of the middle of the latter. A spring $A^4$ or other returning means for the pedal A would be then provided.

If the springs $C^{13}$ and $C^{14}$ were omitted all the brakes would, to all intents and purposes, be applied simultaneously, and a continued operation will cause one diagonally disposed pair of brakes to be applied with greater power than that of the other pair.

Obviously both sets of brakes may be operated by cams or by levers, for example in the latter case as illustrated in Figs. 6 and 7, whether they are operated in pairs arranged fore and aft of the vehicle or in pairs diagonally disposed, and preferably lost motion devices will be inserted in the mechanism where necessary to permit successive application of the pairs of brakes.

Fig. 5 shows a modified arrangement of connections for a direct pull upon both sets of brakes from the pedal A and in this arrangement the pedal obviously is disposed at some point intermediate the two sets of brake-applying devices.

Fig. 3 shows a further modification of the connections in which one set of brakes is applied by a cam $A^1$ where the rod $C^2$ is connected directly to a portion of the pedal.

Fig. 4 is a still further modification where a cam $A^1$ is used to apply one set of brakes and the pedal A is used in a similar position to that shown in Fig. 5.

In both Figs. 3 and 4 (in the first case in dotted lines and in the second case in full lines) the cam is shown as first applying one set of brakes through the medium of the rod $B^4$ to a certain degree, then maintaining that degree for a short period, and subsequently applying a still further braking effort; the latter additional braking effort is applied by that portion of the cam marked $A^5$.

Fig. 2 shows a cam $A^1$ so shaped that after the point $A^3$, referred to in connection with Fig. 1, has been reached the power of the brakes is slightly decreased by a depression $A^6$ in the cam so that by a follow-on movement of the pedal A after the brakes have been applied for a predetermined degree by the first portion of the movement, their power may be decreased, after which it may remain unaltered by curving the cam so that it is concentric with its center of rotation, or a still further increase may be applied as by means of that portion of the cam shown in dotted lines at $A^5$. Under deceleration the greater the speed the greater will be the "piling" forward of the weight as the mass is brought to rest. After one set of brakes, for example the rear brakes, has become sufficiently effective, it will be found convenient and beneficial to ease off some of the pressure of the other brakes, for example the front brakes, without affecting the operation of the first-mentioned brakes.

Where there is a pin-and-slot connection between the link $C^2$ and the compensating bar $C^4$ a separate operating lever may be arranged, in connection with the brakes operated through the medium of the compensating bar $C^4$, to apply them independently of the other brakes. Alternatively a separate set of brakes may be provided and two arrangements for this purpose are illustrated in Figs. 14 and 15 respectively.

Referring first of all to Fig. 14, the pedal A operates upon the lever D pivoted at $D^1$ through the medium of a roller $D^2$ journaled in the end of the lever. The lever D is arranged to have sliding engagement with a rod $D^3$ which, at one end, is secured to the compensating bar $B^5$ of the front brakes, and has on it an adjustable stop $D^4$ to allow the lever D to operate the brakes when it is moved by means of a cam $A^1$. The pedal A is connected in the manner referred to in connection with Fig. 4 with the rod $C^2$ pivotally connected with the compensating bar $C^4$ operating brakes in connection with the rear wheels which, however, it is unnecessary to illustrate in view of the previous description of the invention. The end of the rod $D^3$ remote from its connection with the compensating bar $B^5$ has sliding connection at $D^5$ with an arm $D^6$ rigidly secured to a rock shaft $D^7$. An adjustable stop $D^8$ on the rod $D^3$ determines the position of the arm $D^6$ at which it will cause movement of the rod $D^3$ by operation of a hand-lever E working through a cam $E^1$ on to a roller $E^2$ journaled in an arm $D^{11}$ rigidly secured on the rock-shaft $D^7$. As before either or both of the cams $A^1$ and $E^1$ may be replaced by other devices having similar effect.

The hand-lever E is pivoted at $E^3$ and is pivotally connected at its end at $E^4$ to a rod $E^5$ itself pivotally connected to a compensating bar $E^6$ of an independent set of brakes. These brakes may apply their braking effort to the rear set of wheels, if desired, and it will be seen that by adjusting the stop $D^8$ the lever E may be caused to apply both the independent sets of brakes and the front brakes through the medium of the rod $D^3$ sliding through the end of the lever D without operating the rear wheel brakes which are in connection with the pedal A.

In Fig. 15, the parts are similarly arranged, that is to say, the pedal A is connected with the rear wheel brakes by means of the rod $C^2$ and with the front wheel brakes by means of the rod $D^3$, the rod $D^3$ having on it stops $D^4$ and $D^8$ as described in connection with Fig. 14. A hand-lever E is connected with a rock-shaft $D^7$ and has rigidly secured to it a lever F, one end of which has sliding connection at $F^1$ with the rod $D^3$ and at the other end a sliding connection $F^2$ with a rod $F^3$ connected through a compensating bar $E^6$ with an independent set of brakes. If desired, the sliding connection $F^2$ might be a pivoted connection with the end of the rod $F^3$ and the stop $F^4$ on the rod $F^3$ could be dispensed with.

In all the constructions herein described or referred to, the cam for operation of the brakes or the direct connections therefor can be replaced by a spring or resilient member. Thus in the case illustrated in Fig. 15, the front brakes are shown operated by means of a spring from the pedal A, for which purpose the rod $D^3$ is capable of sliding through the compensating bar $B^5$ and has at or near its extremity a nut $D^9$ which holds between it and the compensating bar $B^5$ a coiled compression spring $D^{10}$. The compression spring $D^{10}$ may be regulated and if desired may be replaced, with suitable modifications, by a tension spring or other resilient member. The stops and sliding connections may be replaced by any other similarly acting connection.

If the parts are so adjusted that the rear brakes commence to act simultaneously with the front brakes, the power of the former may be either greater or less than the power of the latter and by a suitable adjustment of the spring or like member in connection with the front brakes the rapidity with which the power increases for a given movement of the lever may be regulated.

As before, the parts may be arranged to enable the brakes to be applied in pairs diagonally of the vehicle, or in any manner herein described. When arranged to apply the brakes diagonally the wear on the brakes may be equalized largely by altering the connections and reversing the order of diagonal braking.

Thus it will be seen if the brakes are applied with the foot pedal through a spring in connection with the compensating bar of the front wheels, the latter may be braked to a degree determined by (a) the tension of the spring, which tension may be adjustable, or (b) by the same method but with the addition of the cam described in connection with any of the other embodiments. The rear wheel brakes may be applied simultaneously prior to or subsequently to the application of the front brakes and to any required degree, even to locking.

If the brakes are applied with the hand lever, the front brakes may be applied as above described and independent rear wheel brakes may come on in the ordinary manner. The front wheel brake system is common to both pedal and hand lever systems as the connection between the pedal and the bar applying the front wheel brakes may be a sliding connection, the movement of which, in one direction to apply the brakes, is limited by an adjustable stop on the bar. The pedal and hand lever systems, however, do not interfere with each other owing to the sliding connection between the two, and any form of sliding or lost motion device which will render the two systems operable as above described may be employed. The adjustment enables the hand-operated brake to be applied either simultaneously or otherwise with the front wheel brakes; or all the pedal-operated brakes may be applied in a similar manner either simultaneously or otherwise by the operation of the hand-lever, the connection between the pedal and all the brakes operated by it being designed and arranged for this purpose. The hand lever and the pedal brakes may be used simultaneously.

Of course if desired the hand-lever in connection with the independently operated brakes could be made to operate all the pedal-actuated brakes, and the latter could be applied with different degrees of power as hereinbefore described or with successive braking effects, either of which features may be grouped as regards the brakes themselves as found desirable. The sliding or lost motion connections between the rock-shaft $D^7$ of the hand-operated lever and the connections with the various brake-applying devices, or the cam itself, may be so arranged that the pedal or front brakes are only applied at the required time. Provision may be made for the release, or partial release, of the pedal or front brakes at any point in their operation, as previously described. The cam $E^1$ in the construction described in connection with Fig. 14, or the positive connection for a single part in connection with Fig. 15, may be replaced by a spring, and in all cases herein described or referred to where a spring can be employed, it may, if desired, be employed in combination with a cam.

Thus it will be seen that there may be provided two independent brakes, and it is also possible, by suitably designing the various operating connections, to lock any two brakes arranged about the same transverse axis, or in fact to lock any or all of the brakes or to apply them to any required degree. They may also be finally locked even though at one portion of the operation the power of the brakes has been previously decreased in the manner described.

Although the invention has been described as applying the front brakes before the back, obviously the action may be reversed and the back brakes may be applied before the front brakes and the manner in which the various sets of brakes are operated may be obviously interchanged as may be found desirable.

The brakes may be grouped in any required manner, and the various connections may be made to single brakes or sets of brakes which may be of any preferred type, to apply the brakes in any desired sequence.

Although a detailed description of particular applications of the present invention has been described above, the invention is not limited to such details and the various modifications illustrated and described may be used in any required combination as may be found particularly applicable to any required case.

What I claim as my invention and desire to secure by Letters Patent is:—

1. Brake applying mechanism for vehicles, comprising an operating lever, brakes for the front and rear wheels of the vehicle, means operable from the said operating lever to apply the brakes and for varying the braking effect, substantially as described.

2. Brake applying mechanism for vehicles, comprising an operating lever, brakes for the front and rear wheels of the vehicle, means operable from the said operating lever to apply the brakes successively and for varying the braking effect successively, substantially as described.

3. Brake applying mechanism for vehicles, comprising an operating lever, brakes for the front and rear wheels of the vehicle, means operable from the said operating lever to apply the brakes to a determined extent, and means for decreasing the braking effect at one or more of the brakes, substantially as described.

4. Brake applying mechanism for vehicles, comprising an operating lever, brakes for the front and rear wheels of the vehicle, means operable from the said operating lever to apply the brakes, and means for establishing a maximum effective power of the brakes in succession, substantially as described.

5. Brake-applying mechanism of the type described comprising a lever, a member operated thereby capable of actuating the brakes first to be applied, and connections between the said lever and the other brakes by which lost motion is permitted during a portion or the whole of the period in which the first applied brakes are being sensibly operated.

6. Brake applying machinism of the type described comprising a lever, a member adapted to operate the brakes of certain of the wheels that are disposed in particular relation with reference to the vehicle, means operated by said lever after the said brakes have been first applied, by which the brakes of the other wheels of the vehicle are then applied.

7. Brake applying mechanism of the type described comprising a lever, a member adapted to operate the brakes of certain of the wheels that are disposed in particular relation with reference to the vehicle, means operated by said lever after the said brakes have been first applied, by which the brakes of the other wheels of the vehicle are then applied, and means for adjustment of the said lever in relation to the mechanism connected therewith.

8. In brake-applying mechanism of the type described means for the simultaneous operation of the brakes of certain of the wheels that are disposed in particular relation with reference to the vehicle prior to the operation of the brakes of the other wheels, and resilient members through which the said brakes are applied.

9. In brake-applying mechanism of the type described means for the simultaneous operation of the brakes of certain of the wheels that are disposed in particular relation with reference to the vehicle prior to the operation of the brakes of the other wheels, and resilient members through which the respective sets of brakes are applied.

10. Brake-applying mechanism of the type described comprising a lever, a member operated thereby capable of actuating the brakes first to be applied, and connections between the said lever and the other brakes by which lost motion is permitted during a portion or the whole of the period in which the first applied brakes are being sensibly operated, and an adjustable connection through which the said brakes are applied.

11. In combination with brake applying mechanism of the type described, an independently operated brake and an adjustable connection between the brakes of the brake applying mechanism aforesaid and the operating gear for the said independently operated brake, whereby the brakes may be applied simultaneously or successively.

12. In combination with brake applying mechanism of the type described, a foot pedal by which the said mechanism may be operated, an independently operated brake, a hand controlled lever by which the latter may be operated, and an adjustable connection between the brakes of the brake applying mechanism aforesaid and the operating gear for the said independently operated brake, whereby the brakes may be applied simultaneously or successively.

In testimony whereof I have hereunto signed my name to this specification in the presence of two subscribing witnesses.

CHAS. COLEMAN WRIGHT.

Witnesses:
WILLIAM EDWARD EVANS,
O. J. WORTH.